US012618281B2

(12) United States Patent
Hopkins et al.

(10) Patent No.: US 12,618,281 B2
(45) Date of Patent: May 5, 2026

(54) SWITCHABLE MODE ULTRA-WIDEBAND MODULE

(71) Applicant: The Chamberlain Group LLC, Oak Brook, IL (US)

(72) Inventors: Garth Wesley Hopkins, Lisle, IL (US); Oddy Khamharn, Lombard, IL (US); Maged Riad, Roselle, IL (US); Adelaide Zhang, Northbrook, IL (US)

(73) Assignee: THE CHAMBERLAIN GROUP, LLC, Oak Brook, IL (US)

(*) Notice: Subject to any disclaimer, the term of this patent is extended or adjusted under 35 U.S.C. 154(b) by 210 days.

(21) Appl. No.: 18/377,137

(22) Filed: Oct. 5, 2023

(65) Prior Publication Data

US 2024/0117667 A1 Apr. 11, 2024

Related U.S. Application Data

(60) Provisional application No. 63/413,554, filed on Oct. 5, 2022.

(51) Int. Cl.
*E05F 15/77* (2015.01)
*E05F 15/73* (2015.01)

(52) U.S. Cl.
CPC .............. *E05F 15/77* (2015.01); *E05F 15/73* (2015.01); *E05Y 2400/446* (2024.05); *E05Y 2400/664* (2013.01); *E05Y 2900/106* (2013.01)

(58) Field of Classification Search
None
See application file for complete search history.

(56) References Cited

U.S. PATENT DOCUMENTS 10,313,134 B2 6/2019 Smith
10,328,898 B2 6/2019 Golsch
10,486,646 B2 11/2019 Ledvina
10,555,119 B2 2/2020 Burugupalli
(Continued)

FOREIGN PATENT DOCUMENTS

CN 109844822 6/2019
CN 109891416 6/2019
(Continued)

OTHER PUBLICATIONS

Car Connectivity Consortium; Building Digital Key Solution for Automotive; Jun. 2016; 8 pages.
(Continued)

*Primary Examiner* — K. Wong
(74) *Attorney, Agent, or Firm* — Dority & Manning, P.A.

(57) ABSTRACT

A connectivity module of a vehicle includes Bluetooth and ultra-wideband radios. A processor operatively connected to the Bluetooth radio and the ultra-wideband radio operates the connectivity module in an anchor mode or a tag mode based at least in part upon a proximity of the vehicle to a movable barrier operator. When in the anchor mode the connectivity module is configured to initiate communication between a user device and both the Bluetooth radio and the ultra-wideband radio. When in the tag mode, the connectivity module is configured to respond to the movable barrier operator initiating communication between the movable barrier operator and both the Bluetooth radio and the ultra-wideband radio.

20 Claims, 6 Drawing Sheets

(56) References Cited

U.S. PATENT DOCUMENTS

| | | | | |
|---|---|---|---|---|
| 10,647,296 | B2 | 5/2020 | Golsch | |
| 10,759,389 | B2 | 9/2020 | Ledvina | |
| 10,771,263 | B2 | 9/2020 | Smith | |
| 10,846,960 | B1 * | 11/2020 | Lemberger | G06V 20/63 |
| 10,966,053 | B2 | 3/2021 | Burugupalli | |
| 11,097,689 | B2 | 8/2021 | Golsch | |
| 11,265,929 | B2 | 3/2022 | Hauck | |
| 11,310,663 | B2 | 4/2022 | Kosugi | |
| 11,316,898 | B2 | 4/2022 | Roozbehani | |
| 11,540,124 | B2 | 12/2022 | Graessley | |
| 11,582,215 | B2 | 2/2023 | Benson | |
| 11,663,864 | B2 * | 5/2023 | Kincaid | H04W 76/27 340/5.31 |
| 11,837,038 | B2 * | 12/2023 | McLachlan | G06F 3/04817 |
| 2024/0141711 | A1 * | 5/2024 | Cate | E05F 15/77 |

FOREIGN PATENT DOCUMENTS

| | | |
|---|---|---|
| DE | 102019123628 | 3/2020 |
| DE | 102019101120 | 7/2020 |
| DE | 112018006800 | 10/2020 |
| EP | 3526777 | 8/2019 |
| EP | 3532971 | 9/2019 |
| EP | 3972215 | 9/2020 |
| JP | 2013105280 | 5/2013 |
| JP | 6306364 | 2/2014 |
| JP | 2014026839 | 2/2014 |
| JP | 6093647 | 3/2017 |
| JP | 2018001155 | 1/2018 |
| JP | 2018166727 | 11/2018 |
| JP | 2019076304 | 5/2019 |
| JP | 2019528387 | 10/2019 |
| JP | 2019536329 | 12/2019 |
| JP | 2020052409 | 4/2020 |
| JP | 2020098254 | 6/2020 |
| JP | 2020098255 | 6/2020 |
| JP | 2020181430 | 11/2020 |
| JP | 2020181431 | 11/2020 |
| WO | 2018081583 | 5/2018 |
| WO | 2019138819 | 7/2019 |
| WO | 20190189240 | 10/2019 |
| WO | 2020209201 | 10/2020 |

OTHER PUBLICATIONS

Car Connectivity Consortium; Car-Sharing by Smartyphone Made Possible with Digital Key from Car Connectivity Consortium; CCC Digital Key Brochure | 2020; 2 Pages.

Car Connectivity Consortium; Digital Key Release 3; Technical Specification; Version 1.0.11 (CCC-TS-101); Copyright 2022; 507 pages.

Car Connectivity Consortium; Smart Phone Digital Key; Digital Key is the Next Big Thing in the Connected Car World; Copyright 2018; 2 pages.

Car Connectivity Consortium; Whitepaper; Digital Key—The Future of Vehicle Access; Digital Key 2020; 20 pages.

Qorvo; Getting Back to Basics with Ultra-Wideband (UWB); www.gorvo.com; May 2021; 10 pages.

* cited by examiner

SWITCHABLE MODE ULTRA-WIDEBAND MODULE

CROSS-REFERENCE TO RELATED APPLICATION

This application claims the benefit of U.S. Provisional Patent Application No. 63/413,554, filed Oct. 5, 2022, which is hereby incorporated by reference herein in its entirety.

TECHNICAL FIELD

This disclosure relates to vehicle systems and movable barrier operator systems and, more specifically, to vehicle systems or movable barrier operator systems that employ radio frequency communications.

BACKGROUND

Various vehicle systems and movable barrier operator systems are known. Vehicle system may include a Bluetooth or other wireless module for communicating with user devices, such as a smartphone.

Vehicle systems may also include a transmitter operable to transmit a control signal to a movable barrier operator in the 300-900 MHz range. Movable barrier operator systems can include garage door operators, gate operators, rolling shutter systems, and the like. Examples of movable barriers include garage doors, swinging or rolling gates, shutters, etc. Movable barriers are movable between closed and open positions to allow ingress and egress of vehicles, people, pets, etc. to and from various secured areas such as a garage of a home. Some operations of these systems may be automatically enabled or triggered based on a location of the vehicle such as using GPS.

Known vehicle systems can also include ultra-wideband (UWB) anchors that detect an UWB module of a smartphone operating as a UWB tag and trigger various vehicle functions in response to detecting the smartphone such as unlocking the doors of the vehicle, starting the vehicle, or the like. These in-vehicle UWB modules typically include Bluetooth (e.g., Bluetooth Low Energy (BLE)) radios for receiving and verifying credentials of the smartphone and UWB radios for determining distance, position, angle of approach, etc. of the smartphone relative to the in-vehicle UWB module.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful in a commercially feasible embodiment are often not depicted in order to facilitate a less obstructed view of these various embodiments of the present disclosure. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein that utilize a switchable mode ultra-wideband module of a vehicle to facilitate one or more operations of the vehicle and/or a movable barrier operator system. In particular, such systems and methods described herein can utilize a UWB and Bluetooth module to trigger various system operations for the movable barrier operator system and the vehicle based on the current operating mode of the UWB and Bluetooth module, position information, and/or identification information derived from signals emitted and/or received by the UWB and Bluetooth module.

Figure 1:
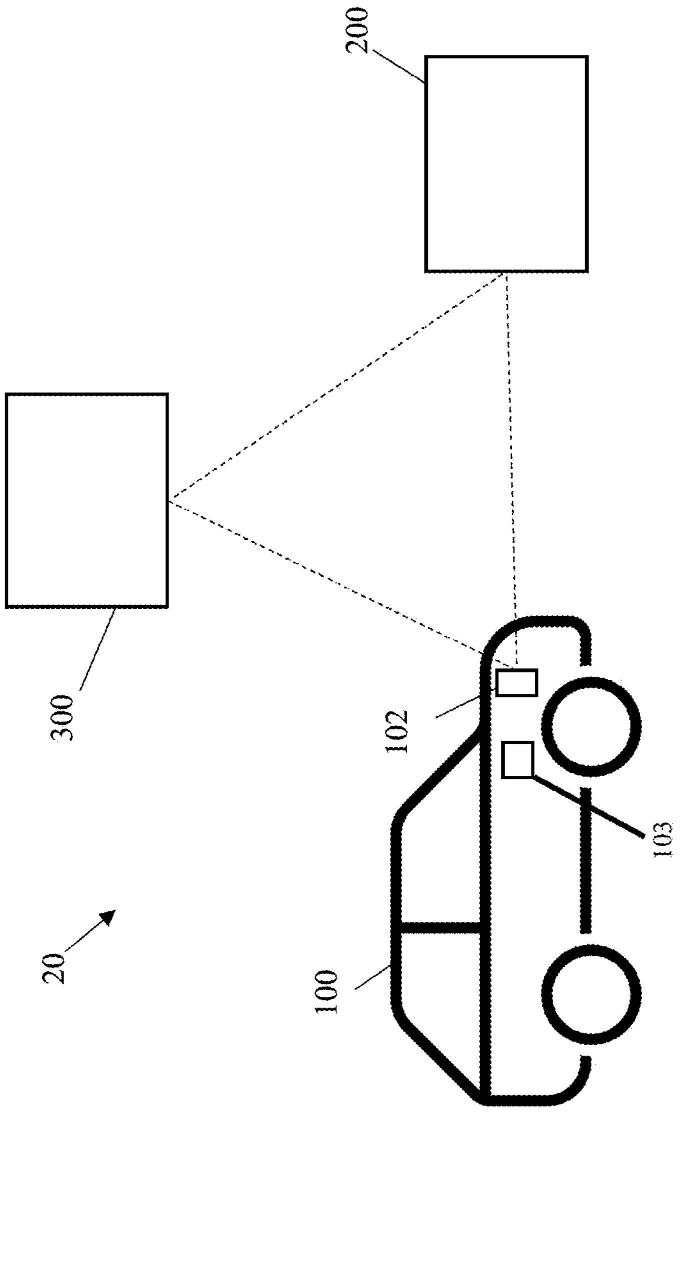
FIG. 1 is a schematic of a network connected vehicle system.

Referring now to FIG. 1, an example connected system 20 is shown. The connected system 20 includes a vehicle 100, a movable barrier operator system 200, and a server computer 300 that wirelessly communicates with the movable barrier operator system 200. As further seen in FIG. 1, the vehicle 100 includes a connectivity module 102 that wirelessly communicates with the movable barrier operator system 200 and the server computer 300. The wireless communication between the connectivity module 102, the movable barrier operator system 200, and/or the server computer 300 may encompass wired and/or wireless communications. For example, the communications between the connectivity module 102 and the server computer 300 may include a wired communication with an in-vehicle communication hub, a wireless communication between the in-vehicle communication hub and a wide area wireless network such as a cellular network, and a communication over the internet. As a further example, the vehicle 100, connectivity module 102, and movable barrier operator system 200 may communicate with various wireless protocols including cellular data transmission, Wi-Fi, BLE, long range Bluetooth, infrared, satellite uplink, microwaves, ad-hoc wireless mesh network, etc.

Figure 2:
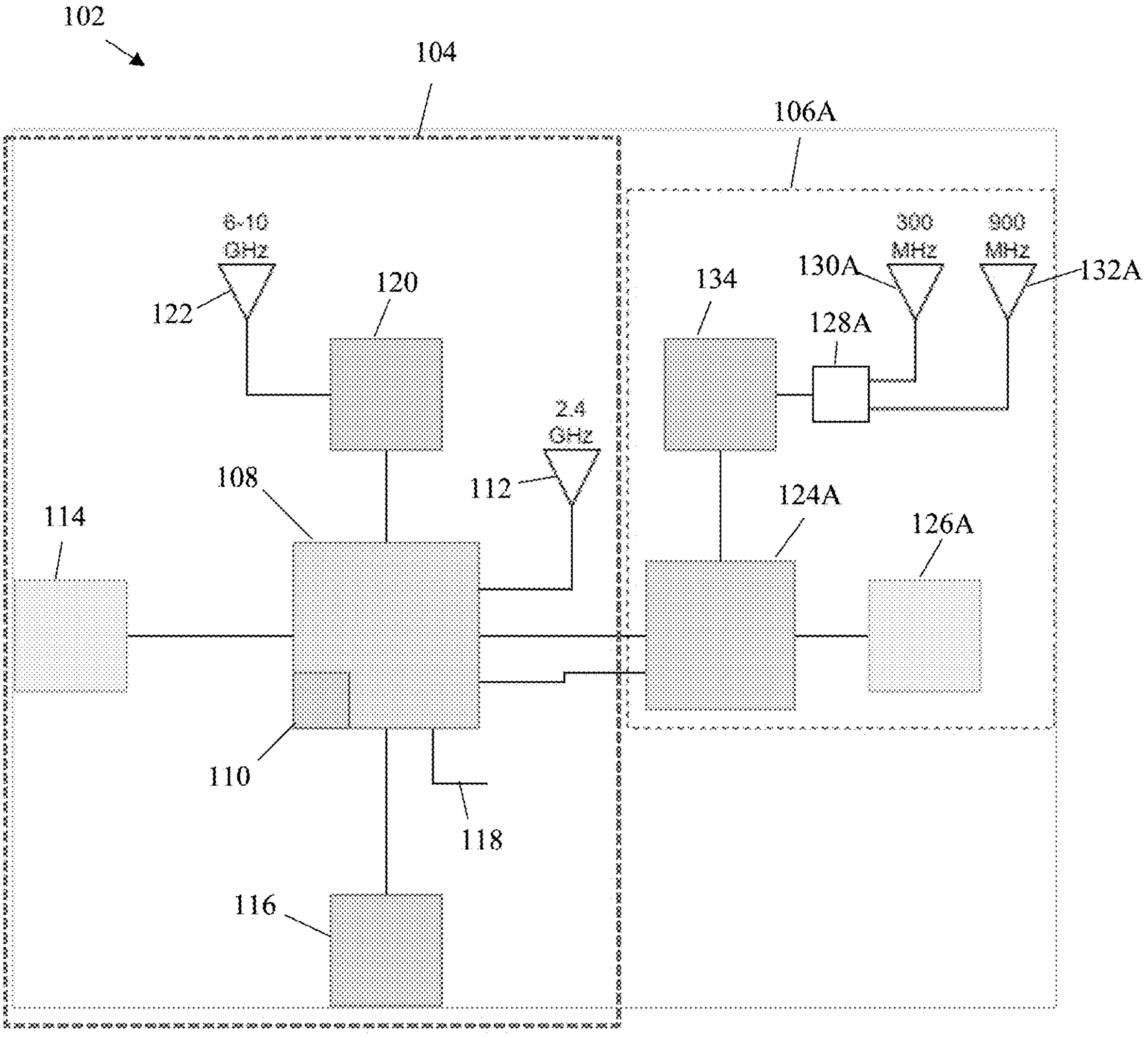
FIG. 2 is a block diagram of a connectivity module of the network connected vehicle system of FIG. 1.

With reference now to FIG. 2, an example embodiment of the connectivity module 102 is shown. The connectivity module 102 includes a switchable mode UWB and Bluetooth module 104 and a secondary communication module 106A. The switchable mode UWB and Bluetooth module 104 includes a processor 108 with an integrated security module 110 and a Bluetooth antenna array 112. In some embodiments, the processor 108 can include, for example, a microprocessor, a state machine, a system-on-a-chip, an application specific integrated circuit (ASIC), and/or a field programmable gate array (FPGA), or a BLE microcontroller. The integrated security module 110 may for example include a hardware security module (HSM). The Bluetooth antenna array 112 may operate in the 2.4 GHz spectrum. Furthermore, the processor 108 or some component thereof can act as a Bluetooth radio that processes signals received from the Bluetooth antenna array 112 and generates signals for transmission by the Bluetooth antenna array 112. It will also be appreciated that, in some embodiments, a separate Bluetooth radio component distinct from the processor 108 can be included as part of the connectivity module 102.

As seen in FIG. 2, the processor 108 is electrically coupled to a memory 114 and a vehicle network bus 116. In some embodiments, the memory 114 can include, for example, an electrical charge-based storage media such as EEPROM or RAM, ROM, or other non-transitory computer readable media such as a flash memory device or magnetic or optical medium. In some embodiments, the vehicle network bus 116 can include a Controller Area Network (CAN) bus or the like for electrically coupling the processor 108 to other electronic devices of the vehicle 100. The UWB and Bluetooth module 104 also includes a debug connection 118 and an ultra-wideband radio 120. The UWB radio 120 includes an UWB antenna array 122. The UWB antenna array 122 may include two or more antennas that are operated by the UWB radio 120 in a frequency range between about 3.1 GHz and about 10.6 GHz, such as between about 6 GHz and about 9 GHz. In some embodiments, the UWB antenna array 122 can include at least three different antennae located at known locations with respect to each other so that positioning based on UWB signals can be achieved in three dimensions including the up, down, forward, reverse, left, and right directions relative to a reference point of the vehicle 100. The use of UWB signals permits high accuracy determinations of relative physical positions between a UWB anchor and a UWB tag, with an accuracy in the range of 10-20 cm, such as an accuracy of 10 cm or less.

Further, the secondary communication module 106A can include another processor 124A electrically coupled to another memory 126A and a sub-GHz radio 134. The processor 124A can, for example include a microprocessor, a state machine, a system-on-a-chip, an ASIC, and/or a FPGA and the memory 126A can, for example, include electrical charge-based storage media such as EEPROM or RAM, ROM, or other non-transitory computer readable media such as a FLASH memory device or magnetic or optical medium. The sub-GHz radio 134 is electrically coupled to a radio frequency module 128A and antenna arrays 130A and 132A. In some embodiments, the antenna array 130A can broadcast and/or receive signals in about the 300 MHz frequency spectrum and the antenna array 132A can broadcast and/or receive signals in about the 900 MHz spectrum.

Figure 3:
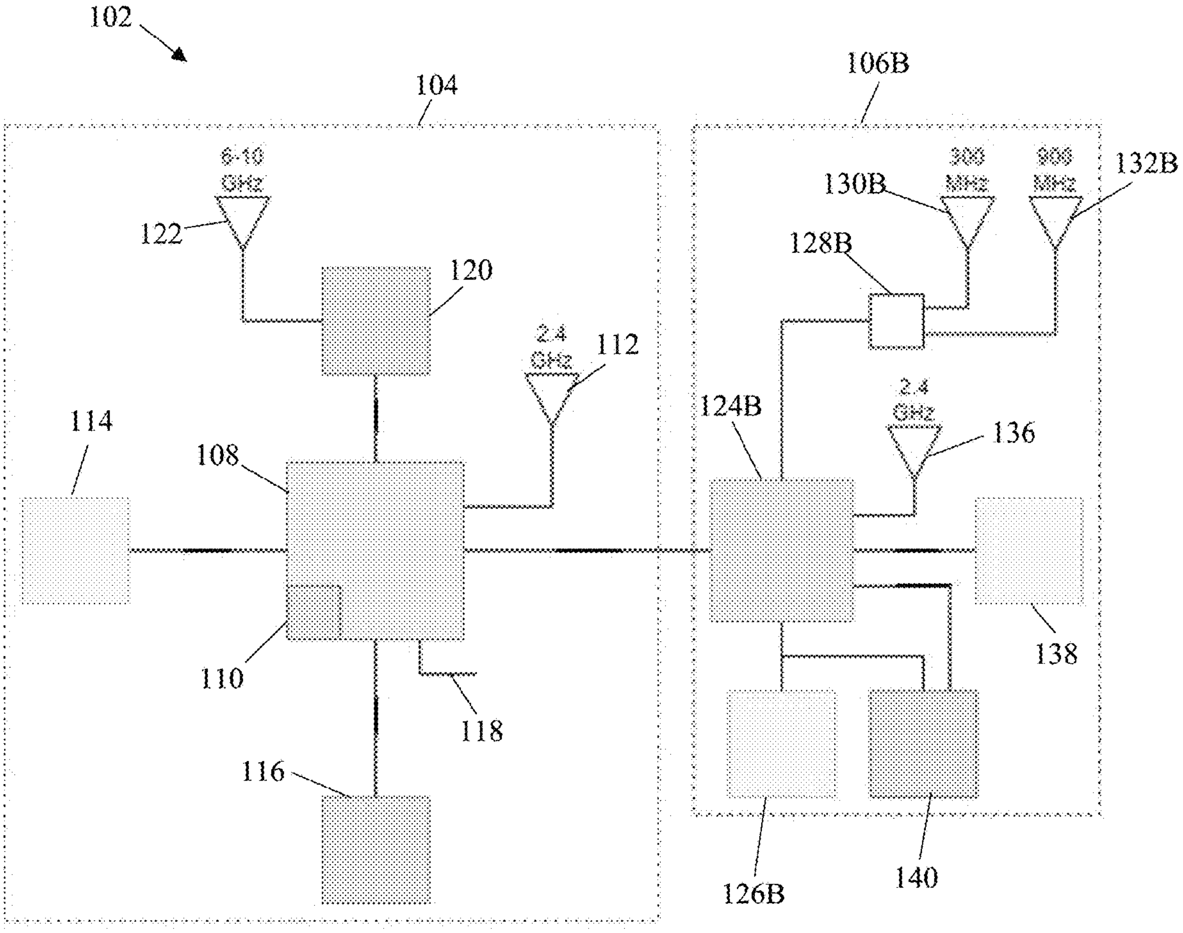
FIG. 3 is a block diagram of another embodiment of the connectivity module of FIG. 2

Turning now to FIG. 3, another embodiment of the connectivity module 102 is provided having a different secondary communication module 106B. The secondary communication module 106B, like the secondary communication module 106A, includes a processor 124B coupled to memory 126B, and a radio frequency module 128B coupled to antenna arrays 130B and 132B. The processor 124B can, for example include a microprocessor, a state machine, a system-on-a-chip, an ASIC, and/or a FPGA and the memory 126B can, for example, include electrical charge-based storage media such as EEPROM or RAM, ROM, or other non-transitory computer readable media such as a FLASH memory device or magnetic or optical medium. Further, the antenna array 130B can broadcast and/or receive signals in about the 300 MHz frequency spectrum and the antenna array 132B can broadcast and/or receive signals in about the 900 MHz spectrum.

The secondary communication module 106B additionally includes another memory 138, which can be for example, include electrical charge-based storage media such as EEPROM or RAM, or other non-transitory computer readable media. Further, the secondary communication module 106B is electrically coupled to an antenna array 136 that broadcasts or received signals in about the 2.4 Ghz spectrum. Further still, the secondary communication module 106B and the memory 126B are electrically coupled to another processor 140 which can include Programmable Integrated Circuit (PIC) module.

In operation, the UWB and Bluetooth module 104 is configured to operate in either a tag mode operation or an anchor mode operation at the direction of the processor 108. Although referred to herein as tag mode and anchor mode, the UWB and Bluetooth module 104 may also be described relative to a tag or anchor role, behavior, or function. For example, in some embodiments, a physical layer (e.g., the coded PHY) of the processor 108 can be configured to switch the operation of the UWB and Bluetooth module 104 between the tag and anchor modes during runtime of the processor 108.

When operating in the anchor mode the connectivity module 102 is configured to initiate communication between a user device and both the Bluetooth radio and the UWB radio 120. In particular, the UWB and Bluetooth module 104 broadcasts Bluetooth radio signals via the Bluetooth antenna array 112 and UWB radio signals via the UWB radio 120 and the UWB antenna array 122. In some embodiments, the Bluetooth radio signals can be standard Bluetooth, Bluetooth Low Energy (BLE), and/or long-range Bluetooth. Further, these UWB and/or Bluetooth signals are received by a nearby UWB and Bluetooth module (e.g., a UWB and Bluetooth module of a user's smartphone) operating in the tag mode that is near the vehicle 100. After receiving the broadcast signals from the UWB and Bluetooth module 104, the tag mode UWB and Bluetooth module transmits a responsive Bluetooth radio signal and/or a UWB signal to the UWB and Bluetooth module 104. The response signal is received by the Bluetooth antenna array 112 and is processed by the processor 108 and or another processor of the vehicle 100 connected to the processor 108 via the vehicle network bus 116. The processor 108 and/or the other processor of the vehicle 100 can then utilize the response signal to authenticate the tag mode UWB and Bluetooth module (e.g., determine whether the tag mode UWB and Bluetooth module of a user's smartphone is authorized or unauthorized). The processor 108 can authenticate the tag mode UWB and Bluetooth module by comparing a credential received from the tag mode UWB and Bluetooth module with known credentials stored in the memory 114 or another local or remote data storage source. Further, the processor 108 or other processor of the vehicle 100 may determine the relative positioning of the nearby tag mode UWB and Bluetooth module based upon UWB frequency signals received by the UWB and Bluetooth module 104.

From the determined authentication and positioning, the processor 108 or other processor of the vehicle 100 may recognize the proximate tag-mode UWB and Bluetooth module (e.g., the module of the user's smartphone) as a "digital key" and proceed to activate a specific functionality or vehicle operation of the vehicle 100 such as operating one or more door locks or opening the trunk of the vehicle 100, illuminating lights of the vehicle 100, turning on or adjusting climate controls, activating an engine of the vehicle 100, and/or various other functionality known to those having skill in the art. Further, in some embodiments, the UWB and/or Bluetooth response signal received from the tag mode UWB and Bluetooth module proximate to the vehicle 100 can include a command that identifies the specific function to be carried out by the vehicle 100.

When operating in the tag mode the connectivity module 102 is configured to respond to the movable barrier operator system 200 initiating communications between the movable barrier operator system 200 and both the Bluetooth radio and the UWB radio 120. In particular, the UWB and Bluetooth module 104 can receive, from an anchor mode UWB and Bluetooth module (e.g., a UWB and Bluetooth module of a garage door operator), a broadcast signal or initial signal such as a Bluetooth radio signal via the Bluetooth antenna array 112 and/or an UWB radio signal via the UWB radio 120 and the UWB antenna array 122. In response to receiving the broadcast signal, the UWB and Bluetooth module 104 can transmit responsive Bluetooth and UWB radio signals that the anchor mode UWB and Bluetooth module can utilize to authenticate the UWB and Bluetooth module 104 and identify a position or proximity of the UWB and Bluetooth module 104 in relation to the anchor mode UWB and Bluetooth module. In some embodiments, the UWB and Bluetooth module 104 when operating in the tag mode can reconfigure the UWB antenna array 122 and/or Bluetooth antenna array 112 to operate at an increased range with a lower bandwidth when compared with the standard BLE operation of the UWB antenna array 122 and Bluetooth antenna array 112 when operating in the anchor mode.

The processor 108 is configured to switch the UWB and Bluetooth module 104 between operating in the anchor mode and the tag mode based on various conditions. For example, the processor 108 may switch the operation from the anchor mode to the tag mode based on a location of the vehicle 100 such as proximity to the garage 201 (see FIG. 4) and/or another location of interest such as prearranged parking spot or parking lot/garage away from a home of an owner of the vehicle 100. In particular, the processor 108 may switch the operation from the anchor mode to the tag mode when a location of the vehicle falls within a predetermined distance of the garage 201 and/or the other location of interest. In some embodiments, the processes of switching the operation between the tag mode and/or the anchor mode can include the processor 108 selecting either the tag mode or the anchor mode based on at least the location of the vehicle 100. The location of the vehicle 100 can be determined using a global navigation satellite system (GNSS) receiver 103, such as a global positioning system (GPS), of the vehicle 100. Additionally or alternatively, the location of the vehicle 100 can be identified in communication with the server computer 300. Further, the processor 108 can switch the operation of the UWB and Bluetooth module 104 from anchor to tag (or vice versa) based on a preset time of day such as a time the vehicle 100 is likely to be proximate to the garage 201 and or the prearranged parking spot or garage. Specifically, the processor 108 can switch the operation of the UWB and Bluetooth module 104 from anchor to tag (or vice versa) when a current day and time match a day and time for which a location of the vehicle 100 is predicted to be proximate to the prearranged parking spot or garage.

Further still, the UWB and Bluetooth module 104 can switch the operation in response to a command from the server computer 300 that is received via a long-range or wide-area communication module e.g., cellular (e.g., 3G, 4G, 5G), WiMax, Wi-Fi, etc. of the vehicle 100 or a radio frequency broadcast received via the secondary communication modules 106A or 106B. As one example in this regard, a user may have a parking application on their smartphone and/or infotainment system that permits the user to park in a secured area at a particular day and time. When the vehicle 100 is in proximity to a gate operator of the secured area at the particular day and time, such as determined via the UWB and Bluetooth module 104 in tag mode interacting with an anchor mode UWB and Bluetooth module of the gate operator, the user may provide an open command to the smartphone or infotainment system that the vehicle 100 communicates to the server computer 300. The server computer 300 may then communicate an open command via the internet to the gate operator and cause the gate operator to open if the gate operator previously confirmed to the server computer 300 that the vehicle 100 is within proximity based upon the UWB and/or Bluetooth signal from the UWB and Bluetooth module 104.

Figure 4:
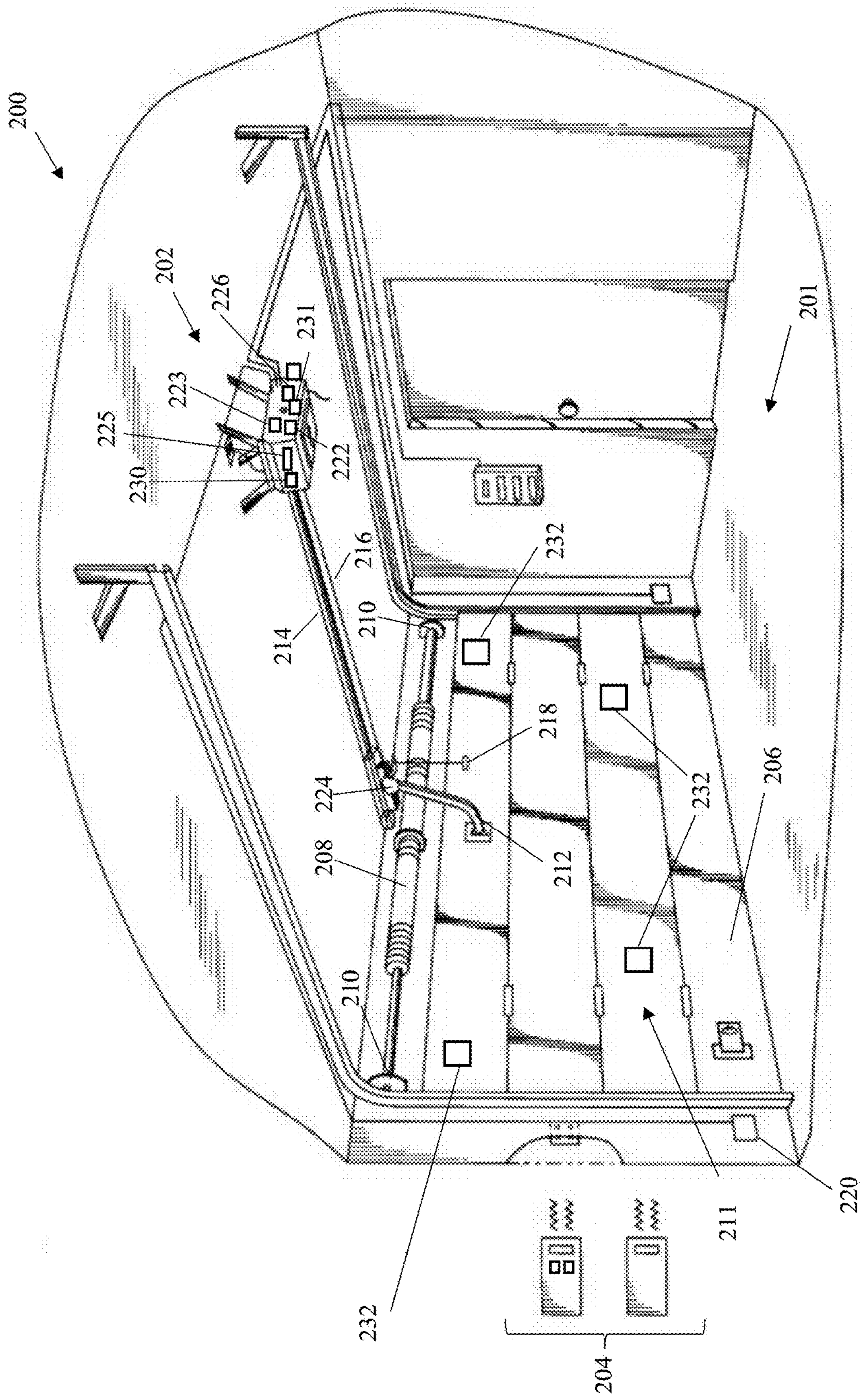
FIG. 4 is a view of an example movable barrier operator system for operating a garage door.

With reference to FIG. 4, an example movable barrier operator system 200 is provided for operating a movable barrier such as a garage door 206 that limits access to a secured area such as a garage 201. In one embodiment, the movable barrier operator system 200 includes a garage door operator 202 and one or more remote controls such as a transmitter 204. The one or more remote controls may also include, for example, a user device such as a smartphone, a wearable apparatus, a laptop computer, a tablet computer, an in-vehicle device such as an infotainment system coupled to an in-vehicle transmitter, a keypad external to the garage 201, a wall control, a visor-mounted remote control, and/or a handheld transmitter such as a key fob. The garage door operator 202 includes an electric motor 222, communication circuitry 223, and a control circuit (including a processor 225 and a memory 226). The processor 225 may include, for example, a microprocessor, a system-on-a-chip, ASIC, and/or a FPGA. The memory 226 may include, for example, an electrical charge-based storage media such as EEPROM or RAM, or other non-transitory computer readable media.

In some embodiments, the garage door operator includes a rail 216 and transmission member 214 such as a chain, belt, or screw driven by the motor 222 relative to the rail 216. The electric motor 222 is operable to move the garage door 206 between open and closed positions. For example, a trolley 224 is coupled to the transmission member 214 as well as an arm 212 that is attached to the garage door 206. The motor 222 shifts the trolley 224 back-and-forth along the rail 216 to lift and lower the garage door 206. A release mechanism 218 is coupled to the trolley 224 to allow the garage door 206 to be disconnected from the garage door operator 202 for manual operation such as during a power failure.

The movable barrier operator system 200 includes a drum and cable mechanism 210 that is attached to the garage door 206. The drum and cable mechanism 210 includes a drum and a corresponding cable on each side of the garage door 206. The drum and cable mechanism 210 couples to a counterbalance such as a torsion spring 208 that assists in lifting the weight of the garage door 206 and enables the garage door operator 202 to open or close the garage door 206 via movement of the trolley 224. In some embodiments, an optical sensor such as a photo eye system 220 senses an object and/or a human who may be in the way of the garage door 206 as the garage door 206 closes.

The movable barrier operator system 200 also includes one or more UWB and Bluetooth modules 211. The UWB and Bluetooth modules 211 include respective Bluetooth radios configured to transmit, receive, or transmit and receive radio frequency signals at a frequency of about 2.4 GHz and respective UWB radios configured to transmit, receive, or transmit and receive radio frequency signals at a frequency between about 3.1 GHz and about 10.6 GHz, and preferably between about 6 GHz and about 9 GHz. In one embodiment, the garage door operator 202 includes UWB and Bluetooth modules 230 and 231 and the movable barrier operator system 200 may include additional UWB and Bluetooth modules 232 of the garage door 206. The UWB and Bluetooth modules 232 of the garage door 206 may include one or more modules on the inside of the garage door 206 and one or more modules on the outside of the garage door 206. The UWB and Bluetooth modules 230 and 231 and the UWB and Bluetooth modules 232 are operably coupled via wired and/or wireless approaches with the processor 225 of the garage door operator 202. For example, the UWB and Bluetooth modules 230 and 231 can receive signals from one or more of the UW B and Bluetooth modules 232 and communicate those signals to the processor 225.

The UWB and Bluetooth modules 230 and 231 and/or the UWB and Bluetooth modules 232 can be operated in an anchor mode where a broadcast signal or initial signal, such as a Bluetooth signal and/or a UWB signal, are broadcast into the environment proximate to the garage 201 so as to trigger any UWB and Bluetooth modules operating in the tag mode to transmit a response signal, such as a Bluetooth signal and/or UWB signal, to the UWB and Bluetooth modules 230, 231, and/or 232. The response signal can be relayed to the processor 225, which may determine the relative positioning of the tag mode UWB and Bluetooth module based upon the UWB frequency signals received by the UWB and Bluetooth modules 230, 231, 232. Further, the processor 225 may utilize a Bluetooth radio signal to authenticate the tag mode UWB and Bluetooth module by comparing a credential received with the Bluetooth radio signals with a known credential stored in the memory 226 or another local or remote data storage source, for example a remote data storage source associated with the server computer 300.

Figure 5:
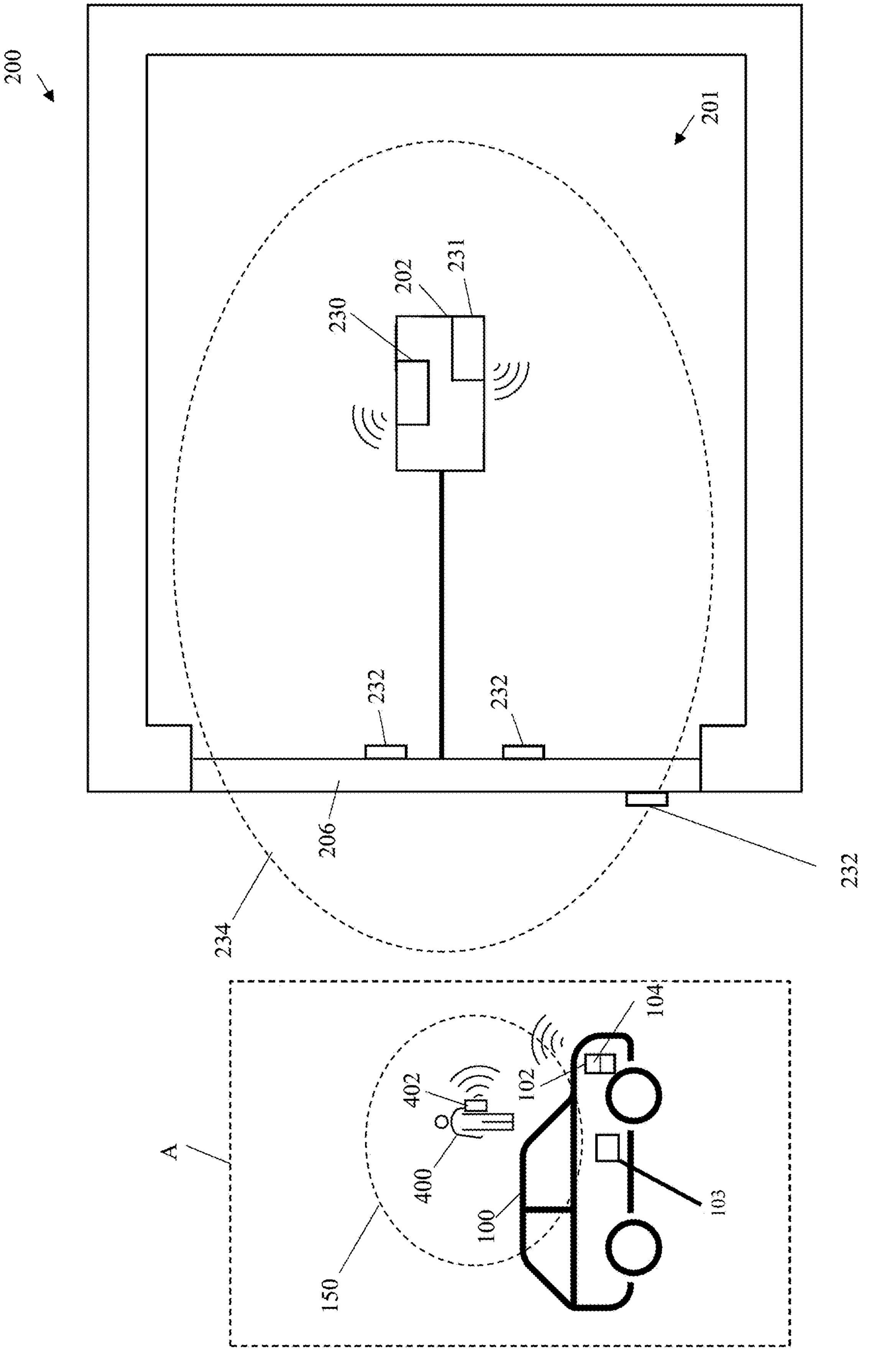
FIGS. 5-6 are schematic plan views of the movable barrier operator system and garage of FIG. 4 in relation to a vehicle.

The operation of the UWB and Bluetooth module 104 included in the connectivity module 102 of the vehicle 100 with respect to the movable barrier operator system 200 will be described in more detail with respect to FIGS. 5 and 6. First, as seen in FIG. 5, when the vehicle 100 is located at a location A remote from the garage 201, the UWB and Bluetooth module 104 defaults to, or otherwise has an initial configuration, wherein the module 104 operates in the anchor mode so as to detect a tag mode UWB and Bluetooth module 402 associated with a user 400 of the vehicle 100 and present within a broadcast range 150 of the UWB and Bluetooth module 104. When the UWB and Bluetooth module 402 is detected within the broadcast range 150 and authenticated using a Bluetooth response signal as described previously, the UWB and Bluetooth module 104 can utilize the UWB response signals to determine a distance of the UWB and Bluetooth module 402 from the vehicle 100 and/or an angle of approach of the UWB and Bluetooth module 402 with respect to the UWB and Bluetooth module 104. The distance and angle of approach can be determined using a time-of-flight calculation for the UWB response signals and a comparison of the time-of-flight or receipt time for the UWB response signals at different ones of the UWB antenna array 122 (see FIGS. 2 and 3). The distance and angle of approach determinations can be used as a proxy for inferring an intent of the user 400 to unlock/enter the vehicle 100. When the distance and angle of approach indicate the user 400 is intending to enter the vehicle 100, the connectivity module 102 can instruct other components of the vehicle 100 to perform various actions such as unlocking one or more doors, starting the engine, etc.

Figure 6:
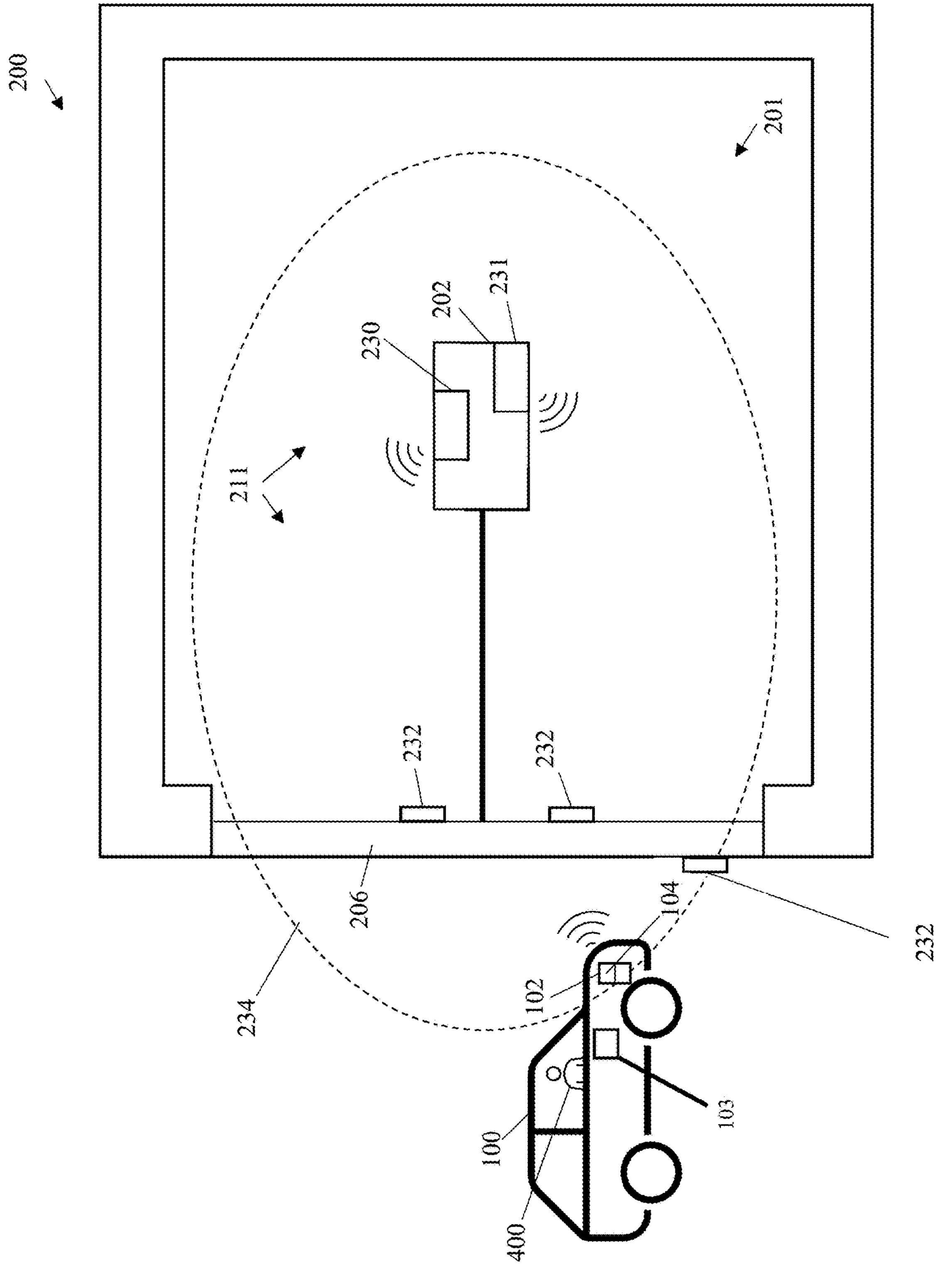

Second, as seen in FIG. 6, when the vehicle 100 is proximate to the garage 201, such as within a predetermined geofence area relative to the garage 201 or within a broadcast range 234 of the of the one or more UWB and Bluetooth modules 211 of the movable barrier operator system 200, the UWB and Bluetooth module 104 can be switched into the tag mode as described above. When the garage door operator 202 detects the UWB and Bluetooth module 104 (e.g., from a Bluetooth communication therefrom) via the one or more UWB and Bluetooth modules 211, the garage door operator 202 can open the garage door 206 to allow the vehicle 100 access to the inside of the garage 201. As with the UWB and Bluetooth module 402 of the user 400, the garage door operator 202 can authenticate the UWB and Bluetooth module 104 as described above using the Bluetooth response signal and utilize distance and angle of approach determinations to assess whether the vehicle 100 is intending to enter the garage 201. In such embodiments, the garage door operator 202 can open the garage door 206 when it is determined that the vehicle 100 is intending to enter the garage 201.

Furthermore, a precision locating feature of the UWB and Bluetooth module 104 and the one or more UWB and Bluetooth modules 211 may enable additional operations with respect to the movable barrier operator system 200. For example, the garage door operator 202 can utilize the location details obtained relative to the UWB and Bluetooth module 104 operating in the tag mode to provide instructions for the vehicle 100 to navigate (e.g., autonomously or via guided prompts to a driver) into a specific location such as a designated parking area or spot inside the garage 201. This specific location can be a previously trained or calibrated location where the vehicle 100 (and portions thereof such as a front or rear bumper) is known to be clear of the garage door 206 and any other known obstacles present in the garage 201 such as bikes, tools, storage boxes, etc. The specific location may be trained to the vehicle and/or garage door operator 202 by the user providing an indication of a desired location of the vehicle such as via an application running on the user's smartphone. In another approach, the vehicle, the garage door operator 202, and/or the cloud server computer 300 may determine the specific location over time such as by the user parking the vehicle in the same location more often than not.

When the garage door is opened, the UWB signal from the garage door operator 202 is not attenuated by the garage door (which is often metal). The UWB signals may be communicated effectively once the garage door is approximately half-way open or more. The position of the garage door 206 may be used to determine whether the vehicle 100 may be autonomously moved into or out of the garage 201. For example, the garage door operator 202 may communicate a "door open" status and an indication that the vehicle 100 is in proximity to the garage as determined using UWB signals to the cloud server computer 300. The cloud server computer 300 may communicate an approval command to the vehicle 100 that indicates the vehicle 100 may pull into the garage. Conversely, if the garage door operator 202 communicates a "door closed" status and an indication the vehicle 100 is in proximity to the garage to the cloud server computer 300, the cloud server computer may communicate a disapproval command to the vehicle 100 that indicates the vehicle 100 should not leave the garage 201.

The presence of the vehicle 100 in the broadcast range 234 of the UWB sensors may be used by the garage door operator 202 as an indication of an attended close. For example, a user may be in the vehicle 100 and provide a user input to a human machine interface (e.g., a touchscreen of an infotainment system) to close the garage door 206. A transmitter of the vehicle 100 transmits a radio frequency command signal, e.g. 315 MHz to close the garage door 206. The garage door operator 202 checks whether the vehicle 100 is in or recently left the broadcast range 234 and, if so, closes the garage door 206 without operating an unattended barrier movement notification apparatus (e.g., a light and/or speaker of the garage door operator 202).

Further still, in some embodiments, the garage door operator 202 can utilize the location details obtained from the UWB and Bluetooth module 104 operating in the tag mode to troubleshoot other wireless connectivity issues for the UWB and Bluetooth module 104 and/or the secondary communication modules 106A and/or 106B. For example, when the secondary communication modules 106A and/or 106B (when constituted by a Wi-Fi radio or the like) are utilized to connect the vehicle 100 to a home wireless network or access point associated with the garage 201, the garage door operator 202 can determine that a data transfer failure over the home wireless network is the result of the vehicle 100 being located too far away from the garage door operator 202 if the UWB and Bluetooth module 104 is outside of or near an outer periphery of the broadcast range 234. Conversely, if the garage door operator 202 determines the vehicle 100 is near the garage door operator 202, but the vehicle 100 continues to experience a data transfer error, the garage door operator 202 may determine there is an issue with the home wireless network itself. The garage door operator 202 and/or the vehicle 100 may communicate a notification to the user indicating the user should move the vehicle 100 or address the issue with the home wireless network as appropriate.

Moreover, the garage door operator 202 can utilize the location details obtained from the UWB and Bluetooth module 104 to initialize the wireless connection between the vehicle 100 and the home wireless network. For example, in some embodiments, when the garage door operator 202 determines, from the location details obtained from the UWB and Bluetooth module 104, that the vehicle 100 is present in the garage 201, the garage door operator 202 can utilize the Bluetooth connection to the UWB and Bluetooth module 104 to share network credentials for the home network with the vehicle 100. In some embodiments, the home network connection may facilitate connection between the vehicle 100 and an original equipment manufacturer (OEM) or other third party server to push down (or have the vehicle 100 pull down) an over the air (OTA) transmission used for upgrading software/firmware of various aspects of the vehicle 100 (e.g. an infotainment system, vehicle system, navigation/map update, etc.). In some embodiments, the garage door operator 202 can send the home network credentials to the vehicle 100 after first determining that a software/firmware upgrade is needed. As another example, the server computer 300 may take into account weather the vehicle 100 is in the garage 201 before sending a notification to a user that the windows of the vehicle 100 are down and weather data indicates the possibility of rain.

Uses of singular terms such as "a," "an," are intended to cover both the singular and the plural, unless otherwise indicated herein or clearly contradicted by context. For example, "a signal" is intended to encompass one or more signals. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A connectivity module of a vehicle, the connectivity module comprising:
- a Bluetooth radio;
- an ultra-wideband radio; and
- a processor operatively connected to the Bluetooth radio and the ultra-wideband radio, the processor configured to operate the connectivity module in:
  - an anchor mode wherein the connectivity module is configured to initiate communication between a user device and both the Bluetooth radio and the ultra-wideband radio; and
  - a tag mode wherein the connectivity module is configured to respond to a movable barrier operator initiating communication between the movable barrier operator and both the Bluetooth radio and the ultra-wideband radio; and
- wherein the processor is further configured to control the Bluetooth radio and the ultra-wideband radio to switch operation of the connectivity module between the anchor mode and the tag mode based at least in part upon a proximity of the vehicle to the movable barrier operator.

2. The connectivity module of claim 1 wherein, when the connectivity module is in the anchor mode, the user device operates as a digital key and the processor is configured to:
- initiate a broadcast of an initial signal from the Bluetooth radio;

receive, via the Bluetooth radio, a response signal from the user device in response to the initial signal;
- determine whether the user device is authorized or unauthorized based at least in part upon the response signal; and
- initiate a vehicle operation when the user device is authorized.

3. The connectivity module of claim 2 wherein the processor is configured to determine whether the user device is authorized or unauthorized using the response signal by comparing a credential received with the response signal to known credentials stored in a memory.

4. The connectivity module of claim 1 wherein, when the connectivity module is in the anchor mode, the user device operates as a digital key and the processor is configured to:
- initiate broadcast of an initial signal from the Bluetooth radio;
- receive, via the Bluetooth radio, a response signal from the user device in response to the initial signal;
- determine whether the user device is authorized or unauthorized based at least in part upon the response signal;
- determine a distance and angle of approach of the user device relative to the vehicle using signals received via the ultra-wideband radio when the user device is authorized; and
- initiate a vehicle operation when the distance and angle of approach indicate an intention to enter the vehicle.

5. The connectivity module of claim 1 wherein, when the connectivity module is in the tag mode, the processor is configured to:
- receive an initial signal via the Bluetooth radio; and
- broadcast, in response to receiving the initial signal, a response signal for the vehicle using the Bluetooth radio and the ultra-wideband radio.

6. The connectivity module of claim 5 wherein the processor is configured to include a credential in the response signal, the credential identifying the vehicle to the movable barrier operator.

7. The connectivity module of claim 1 further comprising a secondary communication module operatively connected to the processor, wherein the processor is configured to wirelessly connect with a server computer via the secondary communication module.

8. The connectivity module of claim 7 wherein the processor is configured to receive an instruction from the server computer to switch the operation of the connectivity module between the anchor mode and the tag mode.

9. The connectivity module of claim 1 wherein the processor is configured to switch the operation of the connectivity module from the anchor mode to the tag mode when a location of the vehicle is within a predetermined distance of the movable barrier operator.

10. The connectivity module of claim 1 wherein the processor is configured to switch the operation of the connectivity module into the tag mode when a current day and time match a day and time for which a location of the vehicle is predicted to be proximate to the movable barrier operator.

11. A vehicle comprising:

a global navigation satellite system (GNSS) configured to receive GNSS data;

a connectivity module comprising:

a Bluetooth radio;

an ultra-wideband radio; and a processor operatively connected to the Bluetooth radio and the ultra-wideband radio, the processor configured to operate the connectivity module in:

an anchor mode wherein the connectivity module is configured to initiate communication between a user device and both the Bluetooth radio and the ultra-wideband radio; and a tag mode wherein the connectivity module is configured to respond to a movable barrier operator initiating communication between the movable barrier operator and both the Bluetooth radio and the ultra-wideband radio; and wherein the processor is further configured to switch operation of the connectivity module between the anchor mode and the tag mode based at least in part upon a proximity of the vehicle to the movable barrier operator determined using the GNSS data.

12. The vehicle of claim 11 wherein, when the connectivity module is in the anchor mode, the user device operates as a digital key and the processor is configured to:

initiate broadcast of an initial signal from the Bluetooth radio;

receive, via the Bluetooth radio, a response signal from the user device in response to the initial signal;

determine whether the user device is authorized or unauthorized using the response signal by comparing a credential received with the response signal to known credentials stored in a memory;

determine a distance and angle of approach of the user device relative to the vehicle based at least in part upon signals received via the ultra-wideband radio when the user device is authorized; and initiate a vehicle operation when the distance and angle of approach indicate an intention to enter the vehicle.

13. The vehicle of claim 11 further comprising a secondary communication module operatively connected to the processor;

wherein the processor is configured to receive, via the secondary communication module, an instruction from a server computer to switch the operation of the connectivity module between the anchor mode and the tag mode.

14. The vehicle of claim 11 wherein the processor is configured to switch the operation of the connectivity module from the anchor mode to the tag mode when a location of the vehicle is within a predetermined distance of the movable barrier operator.

15. The vehicle of claim 11 wherein the processor is configured to switch the operation of the connectivity module into the tag mode when a current day and time match a day and time for which a location of the vehicle is predicted to be proximate to the movable barrier operator.

16. A method for operating a connectivity module of a vehicle, the method comprising:

determining whether the vehicle is in proximity to a movable barrier operator;

selecting a tag mode operation of a connectivity module of the vehicle based at least in part upon the vehicle being in proximity to the movable barrier operator;

selecting an anchor mode operation for the connectivity module of the vehicle that is different from the tag mode operation based at least in part upon the vehicle not being in proximity to the movable barrier operator;

communicating with a user device via a Bluetooth radio and an ultra-wideband radio of the connectivity module when the anchor mode is selected; and communicating with the movable barrier operator via the Bluetooth radio and the ultra-wideband radio of the connectivity module when the tag mode is selected.

17. The method of claim 16 wherein communicating with the user device via the Bluetooth radio and the ultra-wideband radio of the connectivity module when the anchor mode is selected comprises:

initiating broadcast of an initial signal from the Bluetooth radio;

receiving, via the Bluetooth radio, a response signal from the user device in response to the initial signal;

determining whether the user device is authorized or unauthorized based at least in part upon the response signal; and initiating a vehicle operation when the user device is authorized.

18. The method of claim 17 wherein determining whether the user device is authorized or unauthorized based at least in part upon the response signal includes comparing a credential received with the response signal to known credentials stored in a memory.

19. The method of claim 16 wherein communicating with the user device via the Bluetooth radio and the ultra-wideband radio of the connectivity module when the anchor mode is selected comprises:

initiating broadcast of an initial signal from the Bluetooth radio;

receiving, via the Bluetooth radio, a response signal from the user device in response to the initial signal;

determining whether the user device is authorized or unauthorized using the response signal;

determining a distance and angle of approach of the user device relative to the vehicle using signals received via the ultra-wideband radio when the user device is authorized; and initiating a vehicle operation when the distance and angle of approach indicate an intention to enter the vehicle.

20. The method of claim 16 wherein communicating with the movable barrier operator via the Bluetooth radio and the ultra-wideband radio of the connectivity module when the tag mode is selected comprises:

receiving an initial signal via the Bluetooth radio; and broadcasting, in response to receiving the initial signal, a response signal for the vehicle using the Bluetooth radio and the ultra-wideband radio, the response signal including a credential identifying the vehicle to the movable barrier operator.

* * * * *